(12) United States Patent
Osborne

(10) Patent No.: US 6,546,851 B1
(45) Date of Patent: Apr. 15, 2003

(54) PORTABLE COOKING GRILL

(76) Inventor: Robert E. Osborne, P.O. Box 190, Bradley, WV (US) 25818

( * ) Notice: Subject to any disclaimer, the term of this patent is extended or adjusted under 35 U.S.C. 154(b) by 0 days.

(21) Appl. No.: 10/260,140

(22) Filed: Sep. 30, 2002

(51) Int. Cl.[7] .......................... A47J 37/00; A47J 37/07; F24C 1/16
(52) U.S. Cl. ...................... 99/449; 99/450; 126/9 R; 126/30
(58) Field of Search ................ 99/339, 340, 444–450, 99/481, 482; 126/9 R, 9 A, 9 B, 25 R, 25 A, 29, 30, 38, 41 R; 211/181.1

(56) References Cited

U.S. PATENT DOCUMENTS

| | | | | |
|---|---|---|---|---|
| 2,811,099 A | * | 10/1957 | McGoldrick | 99/421 H |
| 3,828,759 A | * | 8/1974 | Cooper | 126/9 R |
| 3,946,653 A | * | 3/1976 | Pugh | 99/340 |
| 4,011,804 A | * | 3/1977 | Crockett, Sr. | 99/421 H |
| 4,109,567 A | * | 8/1978 | Gage et al. | 99/450 |
| 4,178,844 A | * | 12/1979 | Ward et al. | 99/449 |
| 4,393,857 A | * | 7/1983 | Sanford | 126/9 R |
| 4,475,528 A | * | 10/1984 | Kuchenbrod | 126/9 R |
| 4,977,824 A | * | 12/1990 | Shinler | 99/449 |
| 5,317,961 A | * | 6/1994 | Shinler | 99/449 |
| D356,005 S | * | 3/1995 | Goble | D7/337 |
| 5,452,706 A | * | 9/1995 | Meza | 126/30 |
| 5,575,197 A | * | 11/1996 | Cheng | 99/446 |

* cited by examiner

Primary Examiner—Timothy F. Simone
(74) Attorney, Agent, or Firm—Bowles Rice McDavid Graff & Love, PLLC; John J. Giblin, Jr.

(57) ABSTRACT

A portable cooking grill, which is fully capable of disassembly, having a pair of side retaining members, being linear and having a square or rectangular cross-sectional shape, each having a horizontal and a vertical borehole at either end traversing through the side retaining member, and having a plurality of sockets disposed interior of and regularly spaced along one side of the side retaining member. With the sockets of either side retaining member in opposing alignment, the ends of a plurality of traverse rods are each registered within opposing sockets. The assembly of two side retaining members and the plurality of transverse rods are secured in place with two clamping rods, the threaded ends of which register with and traverse through the opposing horizontal boreholes in the side retaining member and are secured in place with torsionally engaged threaded fasteners, forming a rigid grilling surface. The grilling surface is posited above a heat source by four support legs, the threaded end of which are registered with and traverse through the vertical boreholes in the side retaining members. The grilling surface is posited at a desired height by an extended diameter on the support legs. The support legs are secured to the side retaining members by threaded fasteners torsionally engaged on the threaded ends protruding above the vertical borehole in the side retaining member.

7 Claims, 3 Drawing Sheets

PORTABLE COOKING GRILL

BACKGROUND

1. Field of the Invention

The invention disclosed herein is directed to the field of portable cooking grills, especially to those suitable for backpacking and camping excursions.

2. Description of the Related Art

People on recreational outings, including campers, cyclists, boaters, horseback riders, etc., often carry various utensils for preparing meals during the course of their outings. For outings of longer duration or under inclement weather some means for cooking hot meals is very desirable. These outdoor enthusiasts often carry their necessary supplies and equipment with them on their excursion. For these activities, equipment that is, compact, easy to carry, easy to clean, and durable is often a priority.

Outdoor enthusiasts often utilize a portable metal grill to cook meals, using a wood fire built on-site for a source of heat. Such portable cooking grills are common in the art and in commerce. These perform adequately for their intended purpose. They are usually constructed with a grilling surface fabricated by a plurality of parallel transverse metal rods permanently secured to perpendicular supporting pieces by welding or other means. The legs of such portable grills are often either removable from or hinged and foldable under the grilling surface.

While removing or folding the legs of the grill improves its portability, the length and width of the grill in its stored configuration does not change. This often hinders transport of the grill on cycles, horseback or in backpacks and limits the potential size of the grill which may be carried.

SUMMARY OF THE INVENTION

The invention disclosed herein is a portable cooking grill, having enhanced portability by having the grilling surface elements, as well as it support legs, capable of disassembly. With this feature, a portable camping grill can be easily and compactly transported in a backpack, bicycle, motorcycle, all-terrain vehicle, canoe, raft or horseback without consuming limited storage space.

In the present invention, the transverse rods of the grilling surface are not permanently secured to any perpendicular supporting piece. Instead, the transverse rods are removably secured into sockets within two side retaining members at either end of the transverse rods. The side retaining members are secured in place by clamping rods at either end of the side retaining members, thus forming a rigid grilling surface. Four support legs are removably secured to the grilling surface to permit positioning of the grilling surface horizontally above a campfire or other heat source.

One objective of this invention is to provide a portable cooking grill that may be assembled and transported in a compact container.

Another objective is to provide a portable camp grill that may be transported in a backpack or other storage space smaller than the overall length and/or width of its grill surface.

Another objective is to provide a portable cooking grill which is easy to disassemble, store, and clean, and is durable.

DETAILED DESCRIPTION OF THE INVENTION

Figure 1:
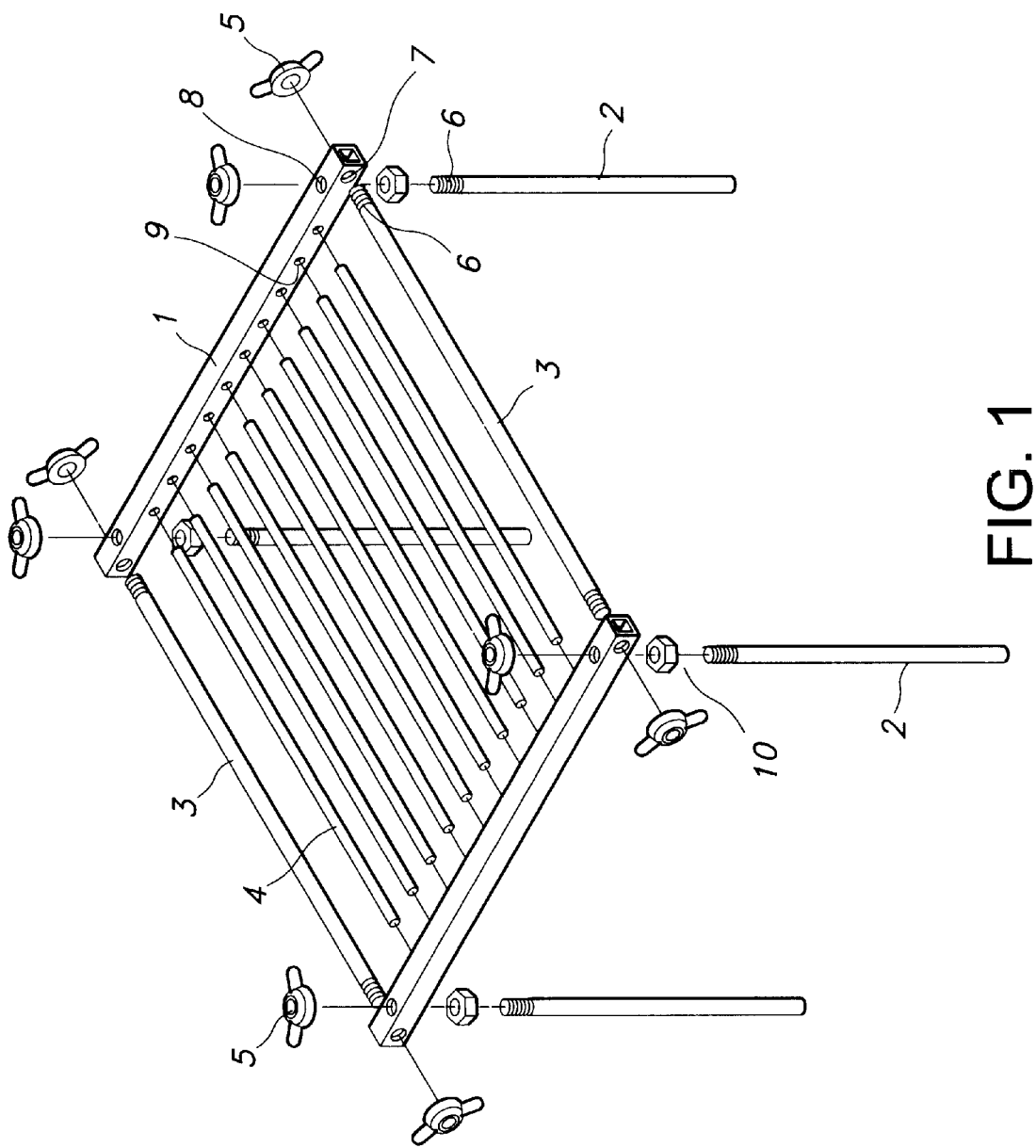
FIG. 1 is an exploded perspective view of the invention.

As shown in FIG. 1, its preferred embodiment, the invention includes two side retaining members 1, a plurality of transverse rods 4 which are arranged in parallel and the ends of which engage the side retaining members 1 in regularly spaced sockets 9. The side retaining members 1 are secured firmly against the transverse rods 4 using two clamping rods 3, being threaded at either end 6, passing through the horizontal bore holes 7 in either side retaining member 1 and secured with a threaded fastener, such as a wing nut 5, forming a stable and secure grilling surface assembly. The assembly is elevated above a heat source by a removable support legs 2 with a threaded end 6 each of which passes through a vertical borehole 8 in the side retaining member 1 and is firmly secured in place with a threaded fastener, such as a wing nut 5.

Figure 2:
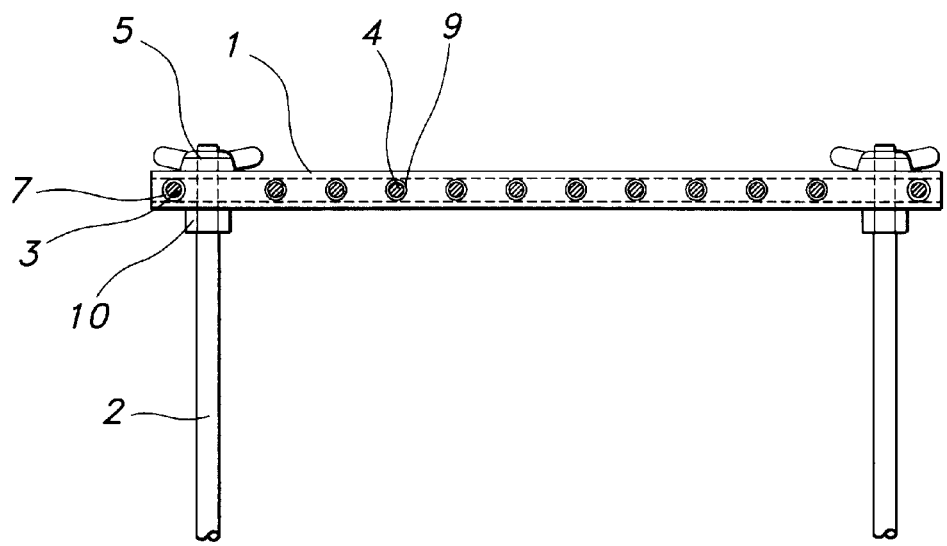
FIG. 2 is an elevation view of the side retaining member.

As shown in FIG. 2, the side retaining member 1 has a rectangular cross sectional shape which is preferably square. Two horizontal boreholes 7 are disposed horizontally and traversing through the side retaining member 1, from its inner side, i.e. that side facing the other side retaining member 1, to the outer side, i.e.—that side facing opposite the other side retaining member 1. The horizontal boreholes 7 are disposed approximate and adjacent to the ends of each side retaining member 1 in the preferred embodiment. Vertical boreholes 8 are disposed adjacent to and interior of each of the horizontal boreholes 7 and are axially aligned perpendicular to the horizontal boreholes 7, the vertical boreholes 8 traversing entirely through the side retaining members 1 from its upper side to its lower side. Disposed along the inner side of each of the side retaining member 1 interior of the vertical boreholes 8 are regularly spaced sockets 9 which are linearly aligned longitudinally along the inner side and axially parallel. The sockets 9 do not extend through the outer side of the side retaining member 1.

In the preferred embodiment, the side retaining member 1 consists of a tube or hollow cylinder with a square cross-sectional shape, having an annular space of square cross-sectional shape, disposed longitudinally along the central axis of the side retaining member 1. The vertical and horizontal boreholes 7, 8 are comprised of two equally sized apertures registered in axial alignment in the corresponding opposite sides of the side retaining member 1. The sockets 9 are formed by apertures in the inner side alone, with the solid outer side serving as the bottom of each socket 9.

The length of the side retaining members may vary, depending on the desired width of the assembled grilling surface.

Figure 3:
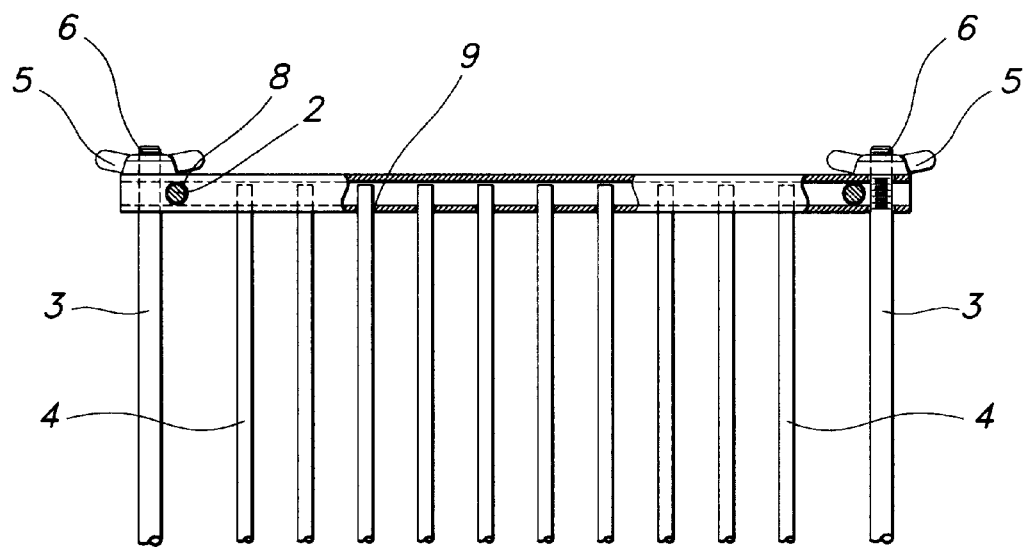
FIG. 3 is a plan view of the side retaining member with partial cutaway view showing the engagement of the traverse rods with the sockets of the side retaining member.

With the sockets of either side retaining member in opposing alignment, the ends of a plurality of transverse rods 4 of equal length are registered with and engaged within the opposing sockets 9 of each side retaining member 1 by sliding into the socket until it contacts with the bottom of the socket 9, as shown in FIG. 3. The diameters of the transverse rods 4 are slightly less than the diameter of the sockets 9, to allow for frictionless insertion of the transverse rod 4 in the socket 9 without excessive vibration once inserted. The lengths of the transverse rods 4 may vary to accommodate the desired size of the assembled grill. In the preferred embodiment for the side retaining member 1 assembly, the ends of the transverse rods 4 pass through the aperture in the inner wall of the side retaining members 1 until it contacts the outer side wall.

With reference again to FIG. 1, the assembly of side retaining members 1 and transverse rods 4 are secured with two clamping rods 3. The ends of each clamping rod 3 is threaded and registered with and traverse through the opposing horizontal boreholes 7 in the side retaining members 1. The length of the clamping rods 3 is sufficiently longer than the transverse rods 4 such that a sufficient length of the threading end 6 protrudes beyond the outer side of the horizontal boreholes 7 in both sides retaining members 1 to permit full engagement of the threaded fastener 5 to the threaded end 6, while all the transverse rods 4 are completely engaged within the sockets 9. Threaded fasteners 5, preferably wing nuts, are disposed onto the threaded ends 6 of the clamping rods 3 and are torsionally engaged thereon, thereby compressing the bottoms of the sockets 9 in the two side retaining members 1 against the ends of the transverse rods 4, forming a rigid grilling surface.

The grilling surface formed by the assembly of the side retaining members 1, transverse rods 4 and clamping rods 3 are supported above a heat source, such as a campfire, by four support legs 2. The support legs 2 are threaded at their upper ends. The upper ends of the support legs 2 are registered with and traverse through the vertical boreholes 8 at either end of each side retaining member 1. The side retaining members 1 are supported upon the support legs 2 at a desired height by an extension of the diameter of the support leg. In the preferred embodiment, this extended diameter is accomplished by a stop nut 10, threaded onto the threaded end 6 and posited under the side retaining member 1. Other embodiments include a washer ring or other fitment attached onto the support leg 2 by welding, brazing, soldering, or by manufacturing the support leg 2 with an extended diameter below the desires point of engagement with the side retaining member 1.

Each support leg 2 is secured by a threaded fastener 5, preferably a wing nut, torsionally engaged onto the threaded end 6 of the support leg 2, compressing the side retaining member 1 between the treaded fastener 5 and the stop nut 10.

In an alternate embodiment, one using the stop nut as the extended diameter and having the threads of the threaded end 6 extend a substantial distance along the length of the support leg 2, at least longer than the combined heights of the side retaining member 1, the stop nut 10 and the threaded fastener 5, the height of the grilling surface above the heat source may be adjusted by positioning the stop nut 10 along the threaded section at the desired height, engaging the side retaining member 1 onto the stop nut 10, and securing in place by torsionally engaging the threaded fastener 5 onto the threaded end 6 of the support leg 2 until snug against the upper side of the side retaining member 1. The length of threads would be preferably four to seven inches. Adjusting the height of the grilling surface would permit use of the grill for a variety of cooking purposes, from gentle warming to intense searing.

The components of this invention are manufactured of a heat-resistant material, preferably stainless steel.

Figure 4:
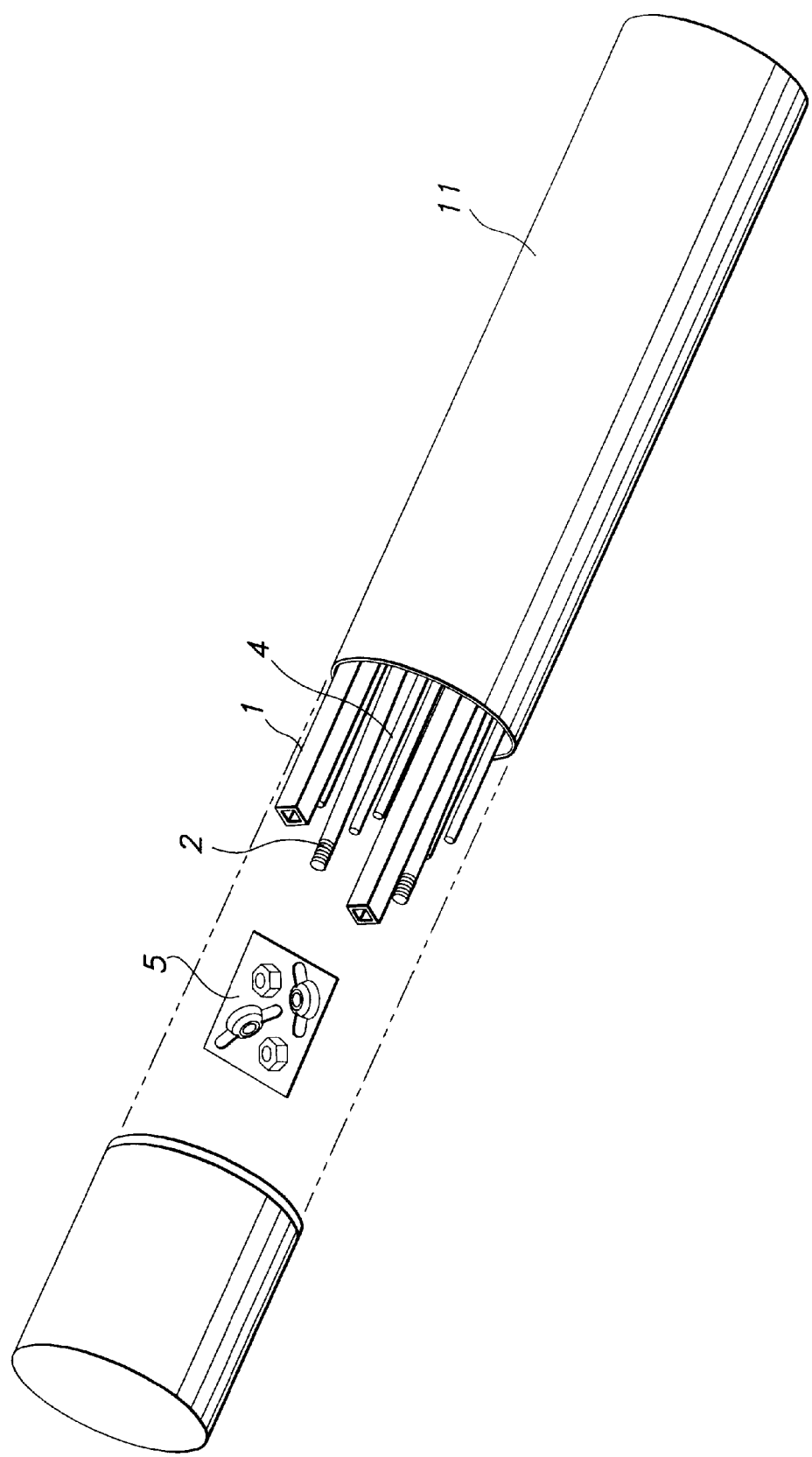
FIG. 4 is a diagram demonstrating the compact storage of the disassembled invention in a storage container.

The invention may be disassembled by removing the threaded fasteners 5 from the ends of the clamping rods 3 and the support legs 2, removing the clamping rods 3 and support legs 2 from the respective horizontal and vertical boreholes 7, 8 in the side retaining members 1, and removing the transverse rods 4 from the sockets 9. As shown in FIG. 4, the components of the invention may be stored and transported in a compact and easily carried tube 11 or similar container.

I claim:
1. A portable cooking grill, comprising:
(a) a pair of side retaining members, each being a cylinder with a rectangular cross-sectional shape, having an upper, lower, inner and outer side, a pair of horizontal boreholes, each disposed radially through the inner and outer sides of the side retaining member proximate to either end of the side retaining member; a pair of vertical boreholes, disposed radially through the upper and lower sides of the side retaining member proximate and perpendicular to and interior of the horizontal boreholes, and a plurality of sockets disposed linearly and axially parallel at regular intervals along the inner side of each side retaining member, interior of the vertical and horizontal boreholes, axially parallel to the horizontal boreholes, and in opposing alignment with the corresponding socket in the other side retaining member;
(b) a plurality of transverse rods, having ends registered and in sliding engagement with corresponding opposing sockets of either side retaining member;
(c) a pair of clamping rods, having threaded ends registered with and traversing through opposing horizontal boreholes in each side retaining member, and a threaded fastener torsionally engaged on the threaded ends, compressibly securing the bottoms of the sockets against the ends of the transverse rods; and
(d) support legs, each having a threaded upper end with a length of threads registered with and removably traversing through each of the vertical boreholes, an extended diameter to vertically support the side retaining member, said extended diameter having a diameter greater than the diameter of the vertical borehole and in supportive engagement with the lower side of the side retaining member, and a threaded fastener torsionally engaged on the threaded end and compressibly securing the lower side of the side retaining member against the extended diameter.

2. The portable cooking grill of claim 1, wherein the side retaining members are each hollow cylinders of square cross-sectional shape, having an annular cavity of square cross-sectional shape disposed axially along its length and wherein the vertical and horizontal boreholes are each two apertures registered axially in the opposite sides of the side retaining member and wherein the sockets are apertures in the inner side of the side retaining member.

3. The portable cooking grill of claim 1, wherein the side retaining members, the traverse rods, the clamping rods and the support legs are manufactured of stainless steel.

4. The portable cooking grill of claim 1, wherein the extended diameter is a stop nut.

5. The portable cooking grill of claim 1, further comprising a cylindrical container for storing and transporting the disassembled components of the grill.

6. The portable cooking grill of claim 4, wherein the length of threads of the threaded upper end of the support legs is more than the height of the side retaining member, stop nut and threaded fastener combined to permit adjustable disposition of the side retaining member at variable positions on the support legs by disposition of the stop nut.

7. The portable cooking grill of claim 5, wherein the length of threads of the threaded upper end is between 4 and 7 inches.

* * * * *